(12) United States Patent
Zamir et al.

(10) Patent No.: US 11,670,104 B1
(45) Date of Patent: Jun. 6, 2023

(54) SYSTEM FOR DETERMINING EMBEDDING FROM MULTIPLE INPUTS

(71) Applicant: AMAZON TECHNOLOGIES, INC., Seattle, WA (US)

(72) Inventors: Lior Zamir, Ramat Hasharon (IL); Miriam Farber, Haifa (IL); Igor Kviatkovsky, Haifa (IL); Nadav Israel Bhonker, Haifa (IL); Manoj Aggarwal, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 170 days.

(21) Appl. No.: 17/097,707

(22) Filed: Nov. 13, 2020

(51) Int. Cl.
*G06V 10/46* (2022.01)
*G06V 40/10* (2022.01)
*G06V 40/13* (2022.01)

(52) U.S. Cl.
CPC ............ *G06V 40/11* (2022.01); *G06V 10/469* (2022.01); *G06V 40/13* (2022.01); *G06V 40/117* (2022.01)

(58) Field of Classification Search
None
See application file for complete search history.

(56) References Cited

U.S. PATENT DOCUMENTS

| | | | | |
|---|---|---|---|---|
| 10,872,221 | B2 * | 12/2020 | Kumar | G06F 21/32 |
| 11,443,120 | B2 * | 9/2022 | Poddar | G06F 40/242 |
| 11,443,553 | B1 * | 9/2022 | Liu | G06V 10/761 |
| 2013/0278501 | A1 * | 10/2013 | Bulzacki | A63F 13/847 |
| | | | | 345/157 |
| 2020/0178809 | A1 * | 6/2020 | Wang | A61B 5/0077 |
| 2021/0358164 | A1 * | 11/2021 | Liu | G06T 7/73 |
| 2022/0058880 | A1 * | 2/2022 | Bondich | G06T 19/006 |
| 2022/0101613 | A1 * | 3/2022 | Rockel | G06T 19/006 |
| 2022/0255995 | A1 * | 8/2022 | Berliner | H04W 4/80 |
| 2022/0283590 | A1 * | 9/2022 | Deyle | G05D 1/0274 |

OTHER PUBLICATIONS

Brownlee, Jason, "How to Perform Face Recognition with VGGFace2 in Keras", Deep Learning for Computer Vision, Machine Learning Mastery, 41 pages. Retrieved from the Internet: URL: https://machinelearningmastery.com/how-to-perform-face-recognition-with-vggface2-convolutional-neural-network-in-keras/.

Joshi, Sumantra, "Face Recognizer Application Using a Deep Learning Model (Python and Keras)", Oct. 14, 2018, 6 pages. Retrieved from the Internet: URL: https://medium.com/@sumantrajoshi/face-recognizer-application-using-a-deep-learning-model-python-and-keras-2873e9aa6ab3.

* cited by examiner

*Primary Examiner* — Soo Shin
(74) *Attorney, Agent, or Firm* — Lindauer Law, PLLC

(57) ABSTRACT

A scanner acquires a set of images of a hand of a user to facilitate identification. These images may vary, due to changes in relative position, pose, lighting, obscuring objects such as a sleeve, and so forth. A first neural network determines output data comprising a spatial mask and a feature map for individual images in the set. The output data for two or more images is combined to provide aggregate data that is representative of the two or more images. The aggregate data may then be processed using a second neural network, such as convolutional neural network, to determine an embedding vector. The embedding vector may be stored and associated with a user account. At a later time, images acquired from the scanner may be processed to produce an embedding vector that is compared to the stored embedding vector to identify a user at the scanner.

20 Claims, 6 Drawing Sheets

SYSTEM FOR DETERMINING EMBEDDING FROM MULTIPLE INPUTS

BACKGROUND

Biometric data may be used for recognition of an individual.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
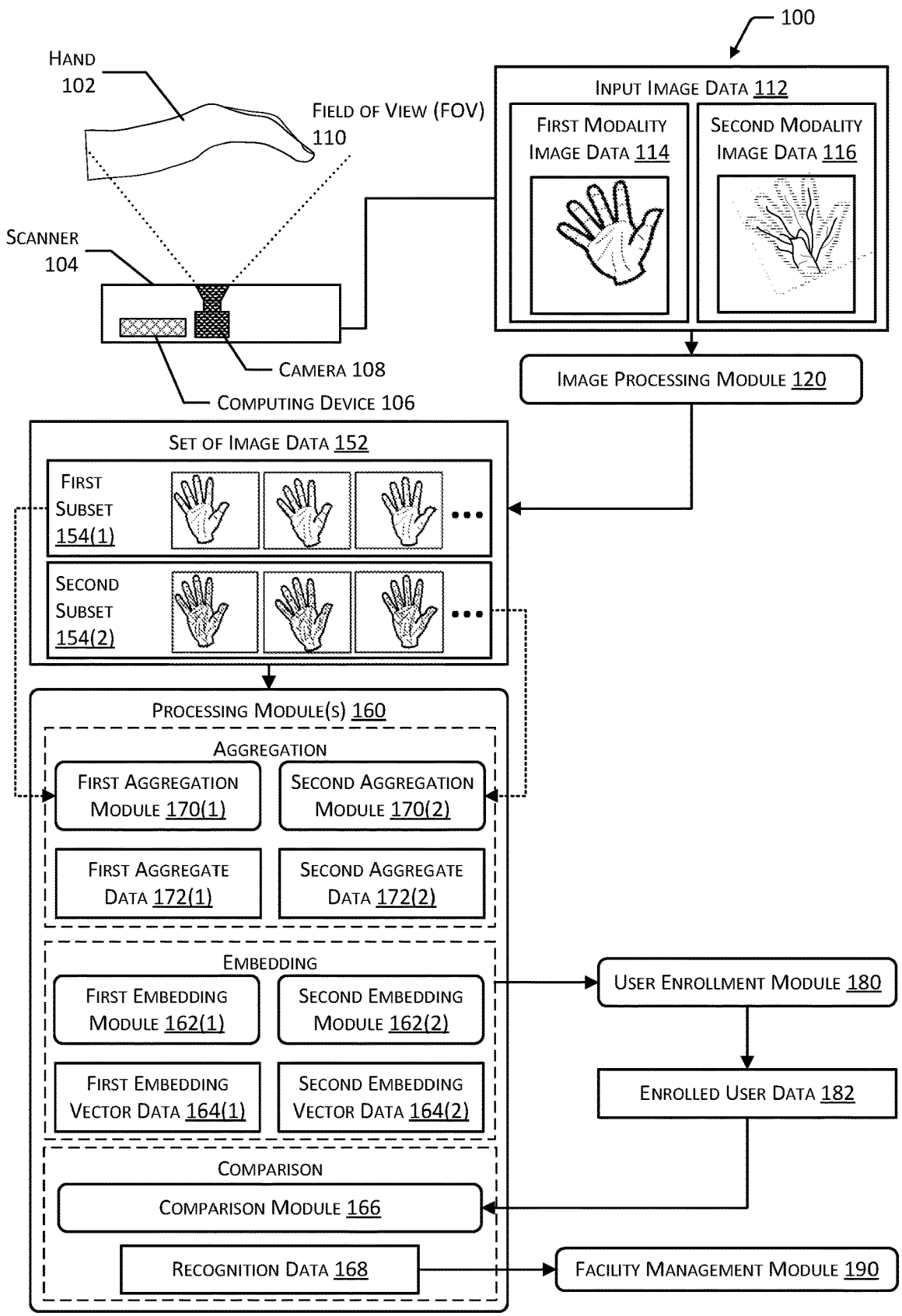
FIG. 1 illustrates a recognition system that determines and uses embedding vector data that is representative of features present in a set of images, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a materials handling facility (facility), office, transportation facility, or other location may be controlled based on user identity. As the user enters the facility, the user may be identified using the devices and techniques described herein. In another example, a point-of-sale system may use the device and techniques described herein to identify a user and determine a payment account to be used for goods or services.

Traditional systems for identifying users suffer from several significant drawbacks including susceptibility to fraud, lack of speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred. Traditional biometric systems may experience poor performance due to use of an instance of input data. For example, a facial recognition system may use a single image of a face to attempt to recognize a user. However, that single image may not be ideal for recognition. For example, the single image may have a portion that is out of focus, obscured, poorly illuminated, and so forth.

Biometric identification systems that use machine learning systems, such as artificial neural networks, may be used to recognize a particular user and assert an identity of that user. Traditional systems process a single image at a time to determine features that are present in the single image and attempt to assert an identity based on these features. However, because a single image is used and that single image may not have sufficient detail, the resulting accuracy of recognition data may be poor in some situations.

Described in this disclosure are systems and techniques for acquiring and using a set of images to recognize a user. For example, a scanner may be used to acquire a set of images of a user's hand. Continuing the example, the scanner may acquire pairs of images, with each pair comprising a first image obtained with a first modality that depicts surface features such as creases and ridges of the hand while a second image obtained with a second modality depicts deeper features such as blood vessels. The set of images may comprise pairs of images acquired using the different modalities over some interval of time. For example, the set of images may comprise ten pairs of images acquired over a 330 millisecond interval of time.

During the acquisition of the set of images, the user's hand may move relative to the scanner. The user may move their hand into and out of the field of view of the scanner, changing the distance between the hand and the camera. The user's hand may move slightly due to muscle tremors. The pose of the user's hand relative to the scanner may change. The user may change the articulation of their hand. As a result of these and other factors, individual images within the set of images may differ from one another. Portions of some images may be blurred, overexposed, not visible, obscured by a sleeve, and so forth. As a result, any individual image may not contain enough biometric detail to assure a highly accurate recognition. However, the combined set of features present in the set of images do contain sufficient information in aggregate.

The set of images are processed using a first machine learning system, such as a convolutional neural network. The set of images may be processed either in a batch or sequentially. Individual images in the set are processed to determine output data that may comprise mask data, feature map data, and so forth. The output data from a plurality of images is combined to determine aggregate data.

In some implementations, the mask data is a spatial mask that may be used to determine which portions of a particular image in the set of images will be included in the aggregate data. For example, the particular image may be processed to determine a frequency of features within a particular area of the image. A specified portion of an area may be referred to as a "patch". The mask data may designate those areas or patches of the particular image having a frequency below a threshold value, as well as those areas having a frequency above the threshold value. The mask data may be used to remove or change a weight associated with the area while determining the aggregate data. For example, while combining the output data, areas that are indicated by the mask data for a particular image as having a frequency below the threshold value may be weighted less than areas indicated as having a frequency above the threshold value.

A feature map provides information about the features present within a particular spatial portion of the image being processed. For example, the feature map may comprise a multidimensional array of data that is representative of the features present within a patch.

The aggregate data may then be processed with a second machine learning system to determine a single embedding vector. For example, the second machine learning system may comprise a second convolutional neural network. The single embedding vector is thus representative of the details that are present in one or more of the images in the set of images.

The single embedding vector may be associated with a first point in a vector space. By comparing the first point with points associated with the single embedding vectors of previously enrolled users, the user may be recognized. For example, if a second point within the vector space is closest to the first point, and the distance between the first point and the second point is less than a threshold value, the identity associated with the second point may be asserted to the user.

Illustrative System

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112 obtained using two or more modalities. The scanner 104 may include other components which are not shown. For example, the scanner 104 may include lights that illuminate the object in the FOV 110.

In the implementation depicted, the hand 102 is held above the camera 108, with the FOV 110 extending upward. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In other implementations, other configurations may be used. For example, the camera 108 may have the FOV 110 extending downwards, and the user may place their hand 102 in the FOV 110 under the scanner 104.

The scanner 104 is configured to acquire multimodal images of the hand 102. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. While in the FOV 110, the hand 102 may move as well. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 may be too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

An image processing module 120 may receive the input image data 112 and perform additional processing. For example, the image processing module 120 may apply one or more filters to the input image data 112. In another example, the image processing module 120 may align the first modality image data 114 and the second modality image data 116. This alignment may include one or more of rotation or translation of a portion of the images.

In some implementations the image processing module 120 may include a multimodal image module that may be used to generate actual multimodal image data (AMID). The multimodal image module may generate the AMID by combining data from two or more modality images into a single image. For example, the first modality image data 114 and the second modality image data 116 may each comprise grayscale images. The multimodal image module may combine the two images to generate the AMID. For example, first grayscale data from the first modality image data 114 may be stored as a first channel of the AMID while second grayscale data from the second modality image data 116 may be stored as a second channel of the AMID.

Traditionally, a single image has been used for biometric identification, such as an image of a face, fingerprint, and so forth. However, a single image may not contain sufficient information to allow highly accurate recognition.

Described is in this disclosure is a system that uses information from a set of image data 152 to determine recognition data 168. The set of image data 152 may comprise one or more of a set of AMID, a set of first modality image data 114, a set of second modality image data 116, or other information. The set of image data 152 may comprise one or more subsets 154. For example, the set of image data 152 may comprise pairs of corresponding first modality image data 114 and second modality image data 116. Continuing the example, the set of image data 152 may comprise a first subset 154(1) and a second subset 154(2). The first subset 154(1) may comprise ten instances of first modality image data 114 and the second subset 154(2) may comprise ten instances of corresponding second modality image data 116 acquired from the user during a first interval of time.

The image processing module 120 may determine what image data to include in the set of image data 152. The set of image data 152 may be determined using one or more techniques. In one implementation, an interval of time may be specified, and a sequence of consecutive input image data 112 acquired during that interval of time may be designated as a set of image data 152. In another implementation, a proximity sensor may be used to determine the set of image data 152. For example, the scanner 104 may include a proximity sensor to determine presence of an object such as a hand 102. The input image data 112 acquired during an interval of time bounded by the sensor transitioning from "no object detected" to "object detected" and then from "object detected" to "no object detected" may be deemed to be a set of image data 152. In other implementations, other techniques may be used. For example, a set of image data 152 may be determined based on a difference between successive input image data 112 being less than a threshold value. When that difference exceeds the threshold value, the set of image data 152 may be deemed to be closed.

The set of image data 152 is provided as input to a processing module(s) 160. The processing module(s) 160 may include one or more portions that perform various functions, such as aggregation, embedding, and comparison. By using the set of image data 152, additional information is available to be used to help recognize the identity associated with the hand 102. An aggregation portion of the processing module(s) 160 may include one or more aggregation modules 170. The aggregation module 170 determines aggregate data 172 that is representative of information in a portion of the set of image data 152, such as a subset 154. Each subset 154 of the set of image data 152 may be processed by a specified aggregation module 170. For example, a first aggregation module 170(1) may determine first aggregate data 172(1) that is representative of information in the first subset 154(1) comprising the first modality image data 114 in the set of image data 152. Continuing the example, a second aggregation module 170(2) may determine second aggregate data 172(2) that is representative of information in the second subset 154(2) that comprises the second modality image data 116 in the set of image data 152. The aggregation module 170 and aggregate data 172 are discussed in more detail with regard to FIGS. 2-3.

An embedding portion of the processing module(s) 160 may include one or more embedding modules. The embedding module 162 comprises a machine learning system that may utilize a deep learning or convolutional neural network. The set of image data 152 is processed by the aggregation module(s) 170 to produce aggregate data 172. In one implementation, a set of aggregate data 172 is determined for each modality of image data present in the set of image data 152. The aggregate data 172 is provided as input to the embedding module 162 to determine embedding vector data 164.

The embedding vector data 164 may be considered a set of values that are descriptive of the hand 102 or other object depicted in the corresponding portion of the set of image data 152, such as a subset 154. In the implementation shown here, separate embedding modules 162 may be used for each modality of input image data 112. For example, a first embedding module 162(1) is used to determine first embedding vector data 164(1) based on the first aggregate data 172(1) corresponding to the first modality image data 114 in the set of image data 152. Continuing the example, the second embedding module 162(2) is used to determine second embedding vector data 164(2) based on the second aggregate data 172(2) corresponding to the second modality image data 116 in the set of image data 152.

A user enrollment module 180 may determine enrolled user data 182 that comprises the embedding vector data 164 that is associated with the enrollment process, as well as information such as a user identifier, name, and so forth. The embedding vector data 164 may act as a "signature" that is uniquely associated with the identity of the user.

During an enrollment process, the user may opt in to use the system 100 and presents their hand 102 to produce a set of image data 152. In one implementation during the enrollment process, the user may present their hand 102. Additional information may be obtained from the user, such as name, contact information, demographic data, payment account information, and so forth. An identity of a particular user may be associated with the embedding vector data 164 data, During subsequent usage, the user may present their hand 102 at a scanner 104. The resulting set of image data 152 may be processed by at least a portion of the processing module 160 to determine that the embedding vector data 164 corresponds to previously stored enrolled user data 182. For example, the resulting set of image data 152 may be processed by the aggregation and embedding portions of the processing modules 160 to process embedding vector data 164. During the enrollment process, the comparison portion of the processing modules 160, such as the comparison module 166, may be used to determine whether the user has been previously enrolled.

The embedding module(s) 162 may comprise a deep learning system, such as a convolutional neural network. The convolutional neural network may utilize a margin-loss based model for training. One implementation of margin-loss models for training neural networks are described by Gao, R., Yang, F., Yang, W., & Liao, Q. "Margin loss: Making faces more separable", IEEE Signal Processing Letters, 25(2), 308-312, 2018. Another implementation of margin-loss models for training convolutional neural networks are described by Liu, W., Wen, Y., Yu, Z., & Yang, M., "Large-margin softmax loss for convolutional neural networks". International Conference on Machine Learning, (Vol, 2, No. 3, p. 7, June 2016). The embedding module 162 is discussed in more detail with regard to FIGS. 2 and 3.

During use of the system 100 to determine an identity associated with a hand 102 presented at the scanner 104, a comparison portion of the processing(s) 160 may be used. The comparison portion may include a comparison module 166 to compare the embedding vector data 164 associated with the set of image data 152 of the unidentified user with the embedding vector data 164 in the enrolled user data 182 to determine recognition data 168. For example, the comparison module 166 may use the first embedding vector data 164(1) and the second embedding vector data 164(2) to determine an identity associated with the user.

A confidence value may be determined that is indicative of similarity between one or more of the embedding vector data 164 associated with the unidentified user and embedding vector data 164 for enrolled users stored in the enrolled user data 182. For example, the confidence value may be determined based on a first Euclidean distance in the vector space between the first embedding vector data 164(1) from the set of image data 152 of the unidentified user and the previously stored first embedding vector data 164(1) in the enrolled user data 182. Continuing the example, the confidence value may also be determined based on a second Euclidean distance in the vector space between the second embedding vector data 164(2) from the set of image data 152 of the unidentified user and the previously stored second embedding vector data 164(2) in the enrolled user data 182. In other implementations, other techniques may be used to compare the embedding vector data 164 of an unidentified user, or a user for whom identity is to be confirmed, with previously stored data.

During operation of the comparison portion of the processing module 160, a user identifier that is associated with the embedding vector data 164 of the unidentified user that is most similar to the enrolled user data 182 may be determined to be the identity of the user. The comparison module 166 may determine the recognition data 168 during production use. For example, the user identifier associated with the closest embedding vector data 164 in the enrolled user data 182 may be associated with the user who presented their hand 102.

The recognition data 168 may provide information such as one or more of a user identifier associated with the user, a location or identification of the scanner 104, data indicative of date and time that the input image data 112 was obtained, and so forth. The recognition data 168 may be subsequently used for various purposes. For example, if the user has been granted access to the facility, a command may be issued to open a gate or door so the user may enter the facility. In another example, the recognition data 168 may be used to determine a payment account or other credentials associated with the user which may then be used in a financial transaction. In yet another example, the recognition data 168 may be passed to a facility management module 190.

The facility management module 190 may use the recognition data 168 to associate an identity with that user as they move about the facility. For example, the facility management module 190 may use data from cameras or other sensors in the environment to determine a location of the user. Given a known path of the user from the gate, the user identity indicated in the recognition data 168 may be associated with the user as they use the facility. For example, the now identified user may walk to a shelf, remove an item, and leave the facility. The facility management module 190 may determine the interaction data indicative of the removal of the item as being associated with the user identifier specified in the recognition data 168, and bill an account associated with the user identifier.

The systems and techniques described above are discussed with respect to images of human hands. These systems and techniques may be used with respect to other forms of data, other kinds of objects, and so forth.

Figure 2:
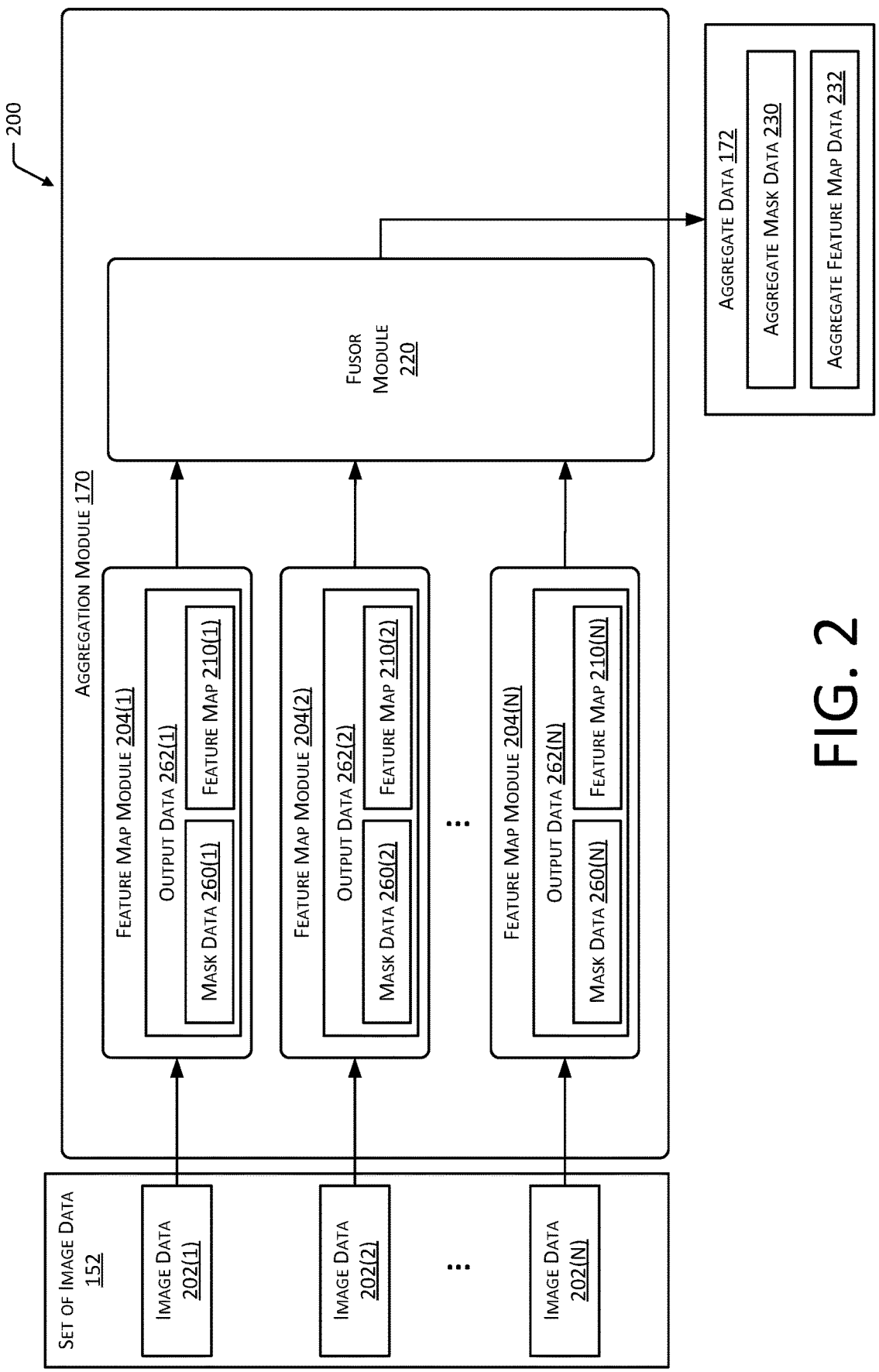
FIG. 2 is a block diagram of an aggregation module that determines aggregate data from at least a portion of a set of images, according to some implementations.

FIG. 2 is a block diagram 200 of an aggregation module 170 that aggregates data from at least a portion of a set of images and determines aggregate data 172 that may then be used to determine an embedding vector data 164 representative of the features present in the set of image data 152, according to some implementations.

The aggregation module 170 may comprise a deep learning system that uses multiple layers of processing to progressively process data. During operation, successive layers may extract higher frequency features from an input image. The deep learning system may utilize a convolutional neural network (CNN) that includes several layers.

At least a portion of the set of image data 152 is provided as input to the aggregation module 170. For example, the aggregation module 170 may process a subset 154 of the set of image data 152. The set of image data 152 comprises image data 202(1), 202(2), . . . , 202(N). The image data 202 may comprise one or more of first modality image data 114, second modality image data 116, actual multimodal image data 124, and so forth. In one implementation, the aggregation module 170 may be used to process images within the set of image data 152 that are associated with a particular modality. For example, the image data 202 may comprise a set of ten first modality images. The image data 202 may be acquired during a single time interval. For example, the image data 202 may be determined based on the input image data 112 acquired by the scanner 104 during a first time interval. In another implementation, the image data 202 may be acquired during a plurality of different time intervals. For example, the image data 202 may be determined based on a first set of input image data 112 acquired by a first scanner 104(1) during a first time interval, as well as a second set of input image data 112 acquired by a second scanner 104(2) during a second time interval.

The aggregation module 170 may comprise a plurality of feature map modules 204 and a furor module 220. In the implementation depicted here, each instance of image data 202 is provided to a corresponding feature map module 204. The feature map module 204 may comprise a machine learning system, such as a convolutional neural network, that is trained to determine output data 262. The output data 262 may comprise one or more of mask data 260, a feature map 210, and so forth.

The mask data 260 may provide information as to particular areas within the image of the image data 202 that are deemed to be of use in determining the embedding vector data 164. The mask data 260 may comprise weight values that are is associated with a particular patch or portion of the image data 202. In one implementation, each instance of the image data 202 may be divided into patches, each patch corresponding to a different area within an image. For example, the image may be divided into a grid that is 10 squares wide and 10 squares tall. Each patch may have a weight value as indicated by the mask data 260. The feature map module 204 may determine one or more characteristics of the pixels within each patch. For example, the feature map module 204 may be indicative of or based on brightness, blurriness, or other characteristics. In another example, the feature map module 204 may determine a metric indicative of frequency of features within the patch. Continuing the example, a high frequency may indicate the patch contains many finely detailed features such as individual ridges and creases on the palm, while a low frequency may indicate that the patch contains fewer features with less detail.

In some implementations, the feature map module 204 may determine a feature vector for the patch, and a magnitude of the feature vector for the patch. The mask data 260 may be based at least in part on the magnitude of the feature vector. Continuing the example, in the set of output data 262, the feature map 210 having a greatest magnitude of feature vector may be selected for inclusion in the aggregate data 172.

The mask data 260 may express the metric that is associated with an associated patch in an image as indicated by the feature map 210. In one implementation, the mask data 260 may be visualized as a "heat map", with high frequency patches having a first color while low frequency patches have a second color. In some implementations, the mask data 260 may be determined by comparing a metric of the patch with a threshold value. For example, a metric indicative of frequency of features in a patch may be compared to a threshold value to determine binary mask data 260. Patches having a frequency value that is less than a threshold value may be assigned a value of 1, while patches having a frequency value greater than or equal to the threshold value may be assigned a value of 0. During application of the mask data 260, a patch having a value of "0" may be processed, while a patch having a value of "1" may be disregarded from further processing.

In other implementations, the mask data 260 may comprise larger bit values. The use of the mask data 260 may allow for finer-grained weighting to be applied. For example, a patch having a metric value of 67 may be weighted less during subsequent processing than a patch having a metric value of 254. The use of the mask data 260 allows the furor module 220 or other modules to take into account variations in quality of data, usefulness of particular regions on a hand 102, and so forth. For example, patches that are associated with the palm may be assigned a greater weighting and given greater consideration than patches corresponding to the wrist.

The aggregation module 170 may also determine a feature map 210. The feature map 210 may comprise a multidimensional array of data that is representative of the content of particular areas within the image data 202, such as the patches. For example, the feature map 210 may comprise vector values for each of the patches. In one implementation, the vector values may be generated by one or more layers within the CNN of the feature map module 204. For example, the CNN may accept the image data 202 at an input layer. The input layer provides input to a convolutional layer that performs convolution operations on portions of the input layer. In some implementations other operations may be performed as well.

The process is performed for at least a portion of the image data 202 in the set of image data 152. In some implementations, some image data 202 may be discarded. For example, image data 202 that has an average brightness that is less than a threshold value may be omitted from further processing. In another implementation, the mask data 260 may be used to discard image data 202 from further consideration. For example, if the mask data 260 is associated with masking more than a threshold number of patches, the associated image data 202 may be disregarded from further processing.

For each instance of the image data 202 in the set of image data 152 that is to be processed, the feature map module 204 is used to determine corresponding output data 262. For example, if the set of image data 152 includes ten instances of image data 202 that are to be processed, ten instances of output data 262(1)-262(10) are determined. A fusor module 220 combines the output data 262 to determine aggregate data 172. The aggregate data 172 may comprise one or more of aggregate mask data 230, aggregate feature map data 232, or other data.

The fusor module 220 may use one or more techniques to combine the output data 262(1)-262(N) to determine the aggregate data 172. With regard to determining the aggregate mask data 230, one or more techniques may be used. For example, mask data 260 indicative of mask values with respect to particular patches in the image data 202 may be summed. In another example, the greatest or lowest mask value indicated by the mask data 260 may be selected for a given patch.

With regard to determining the aggregate feature map data 232, in one implementation, the fusor module 220 may select from the output data 262 the feature map data 210 associated with a particular patch that may be selected based on the mask data 260. For example, the fusor module 220 may determine the output data 262 by selecting the feature map 210 data corresponding to a patch that has a greatest value in the mask data 260. Continuing the example, for patch 37 that is associated with a particular portion of the image data 202, the value of the mask data 260 for patch 37 that is associated with image data 202(3) may be greatest compared to the mask data 260 for patch 37 of the other image data 202(1)-(2), (4)-(10) in the set of image data 152. As a result, the aggregate feature map data 232 for patch 37 may comprise the feature map 210(3) data associated with patch 37.

In another implementation, the fusor module 220 may determine aggregate feature map data 232 based on a weighted average of feature map 210 data. The weight for a particular instance of the feature map 210 data may be determined based on the mask data 260 associated with that instance. For example, a first weight associated with a first portion or patch of a first image may be determined. The first weight indicates the weight of the information associated with the first feature map 210 for the patch. A second weight associated with a second portion of a second image may be determined. The first portion and the second portion correspond to a same area in the image data, and so refer to the same patch or spatial region within their respective images. The second weight indicates the weight of the information associated with the second feature map 210 or the patch. The fusor module 220 may determine the aggregate data 172 based at least in part on the first weight and the first feature map 210, and the second weight and the second feature map 210. For example, the aggregate feature map data 232 may comprise a weighted average of the first weight and the first feature map 210 and the second weight and the second feature map 210. Continuing the earlier example, the aggregate feature map data 232 associated with patch 37 may comprise a weighted average of the feature map 210(1)-(10) data corresponding to patch 37.

The aggregate data 172 may then be provided as input to the embedding module 162. The embedding module 162 uses the aggregate data 172 as input to determine the embedding vector data 164. The embedding vector data 164 is representative of the aggregate data 172 in a vector space that is representative of the identities of enrolled users.

In one implementation, the aggregation module 170 may comprise a plurality of various modules as shown here that is related to the number of instances of image data 202 in the set of image data 152. For example, if the set of image data 152 includes ten instances of image data 202(1)-202(10), the embedding module 162 may utilize ten feature map modules 204(1)-204(10) to determine ten instances of mask data 260(1)-260(10) and ten feature maps 210(1)-210(10). As additional image data 202 is added, the resulting embedding vector data 164 represents the information provided by the additional image data 202. In some implementations where the number of instances of image data 202 in the set of image data 152 exceeds the number of modules in the aggregation module 170, the aggregation module 170 may iterate through some portions of the image data 202 to produce aggregate data 172 that is stored and then later combined. For example, if the set of image data 152 includes 128 instances of image data 202(1)-202(128) and the aggregation module 170 supports 64 instances of feature map modules 204(1)-204(64), the aggregation module 170 may perform two iterations, then combine the resulting output data 262(1)-262(64) from the first iteration with the resulting output data 262(65)-262(128) from the second iteration with the fusor module 220 to determine the aggregate data 172.

In the implementation depicted in FIG. 2, a set of output data 262(1)-210(N) is determined and then combined by the fusor module 220. In comparison, in the implementation depicted in FIG. 3, image data 202 may be processed sequentially, allowing additional image data 202 to be added while generating aggregate data 172.

Figure 3:
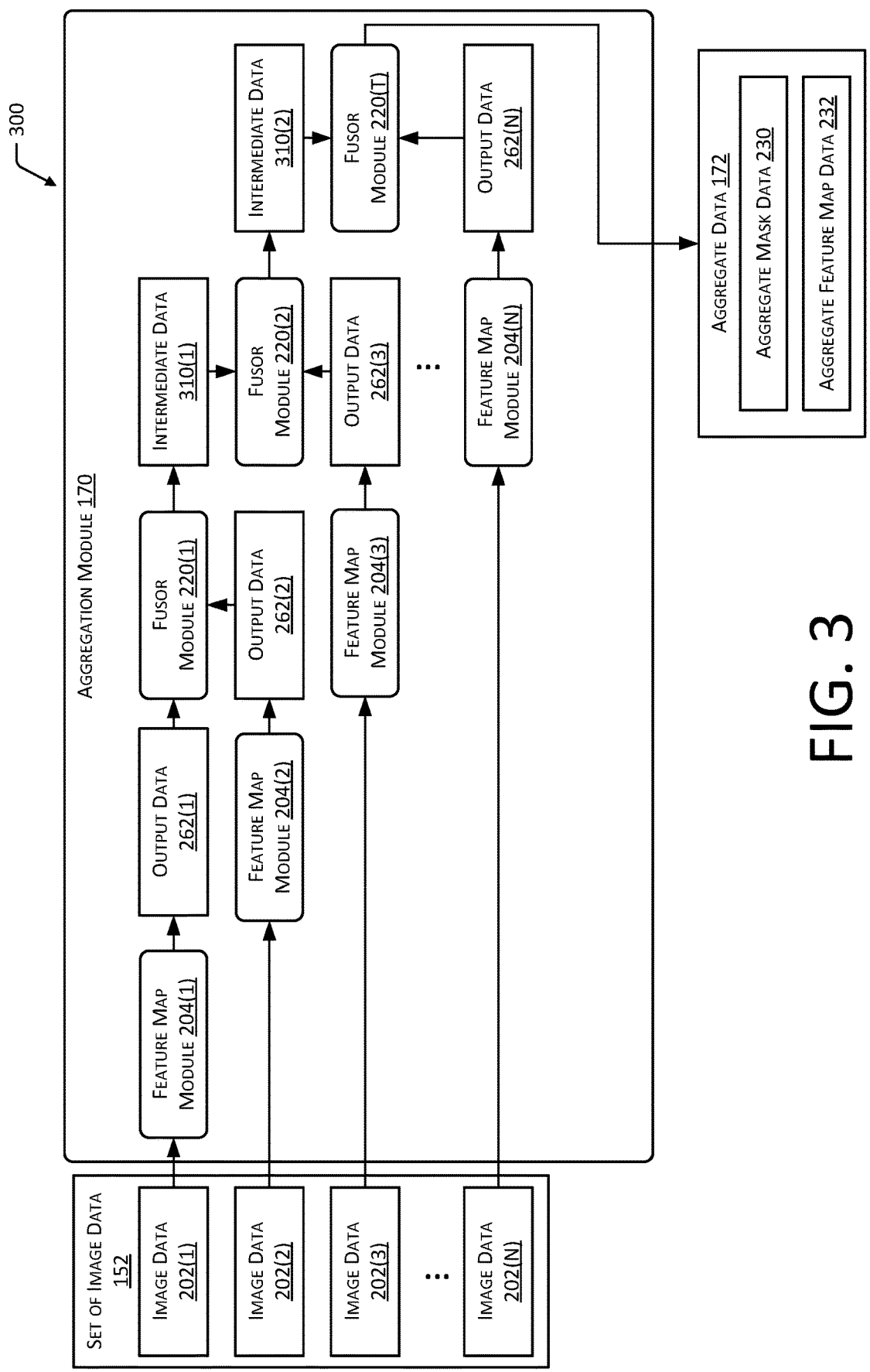
FIG. 3 is a block diagram of an aggregation module that generates aggregate data about images that are sequentially added to a set of images, according to some implementations.

FIG. 3 is a block diagram 300 of an implementation of the aggregation module 170 that sequentially combines output data 262 from the set of image data 152 and uses that output data 262 to determine embedding vector data 164 representative of the features present in the image data 202 in the set of image data 152, according to some implementations.

The image data 202 may be processed sequentially in pairs, triples, or other tuples. In this illustration, a first instance of image data 202(1) is processed with a first feature map module 204(1) to determine first output data 262(1). A second instance of image data 202(2) is processed with a second feature map module 204(2) to determine second output data 262(2). A first fusor module 220(1) combines the first output data 262(1) and the second output data 262(2) to generate first intermediate data 310(1). A third instance of image data 202(3) is processed with a third feature map module 204(3) to determine third output data 262(3). A second fusor module 220(2) combines the first intermediate data 310(1) and the third output data 262(3) to generate second intermediate data 310(2).

An $N^{th}$ instance (where N is a nonzero positive integer) of image data 202(N) is processed with an $N^{th}$ feature map module 204(N) to determine $N^{th}$ output data 262(N). A furor module 220(T) combines the second intermediate data 310(2) and the $N^{th}$ output data 262(N) to generate the aggregate data 172.

The aggregate data 172 may then be provided as input to the embedding module 162. The embedding module 162 uses the aggregate data 172 as input to determine the embedding vector data 164.

With the sequential process, the system 100 may operate to continue to gather information until the aggregate data 172 is deemed sufficient for use in recognizing a user. For example, the set of image data 152 may be appended with image data 202 based on ongoing data received from the scanner 104, such as input image data 112 provided by the image processing module 120. As image data 202 is added, corresponding aggregate data 172 may be generated. The aggregate data 172 may be processed by the embedding module 162 to determine embedding vector data 164. Each instance of embedding vector data 164 may be processed by the comparison module 166. When an instance of embedding vector data 164 is determined to be within a threshold distance of previously stored embedding vector data 164 in the enrolled user data 182, the identity of that associated user may be asserted. However, if insufficient, the system 100 may continue to process additional instances of image data 202 that are added to the set of image data 152. The process may stop adding image data 202 once a particular threshold has been reached. The threshold may be based on one or more of the input image data 112, the aggregate data 172, the embedding vector data 164, or other metrics such as elapsed time. For example, after sequentially accumulating the output data 262 from 20 instances of image data 202(1)-202(20) with no corresponding match in the vector space to aggregate data 172 of previously enrolled user data 182, the unidentified user may be deemed to be unidentified and not previously enrolled.

One or more conditions may be used to determine when to cease one or more of acquisition of input image data 112, aggregation of image data 202 by the aggregation module 170, and so forth. In one implementation, a first magnitude of one or more values of the output aggregate data 172 may be determined. If the first magnitude exceeds a first threshold value, one or more of acquisition of input image data 112 or aggregation of image data 202 may cease.

In another implementation, a second magnitude of the embedding vector indicated by the embedding vector data 164 may be determined. If the second magnitude exceeds a second threshold value, one or more of acquisition of input image data 112 or aggregation of image data 202 may cease.

In still another implementation, one or more of acquisition of input image data 112 or aggregation of image data 202 may cease if elapsed time since start exceeds a threshold value. For example, the process may stop acquiring and using additional input image data 112 if the elapsed time is greater than or equal to 5 seconds since acquisition of the input image data 112 began.

Figure 4:
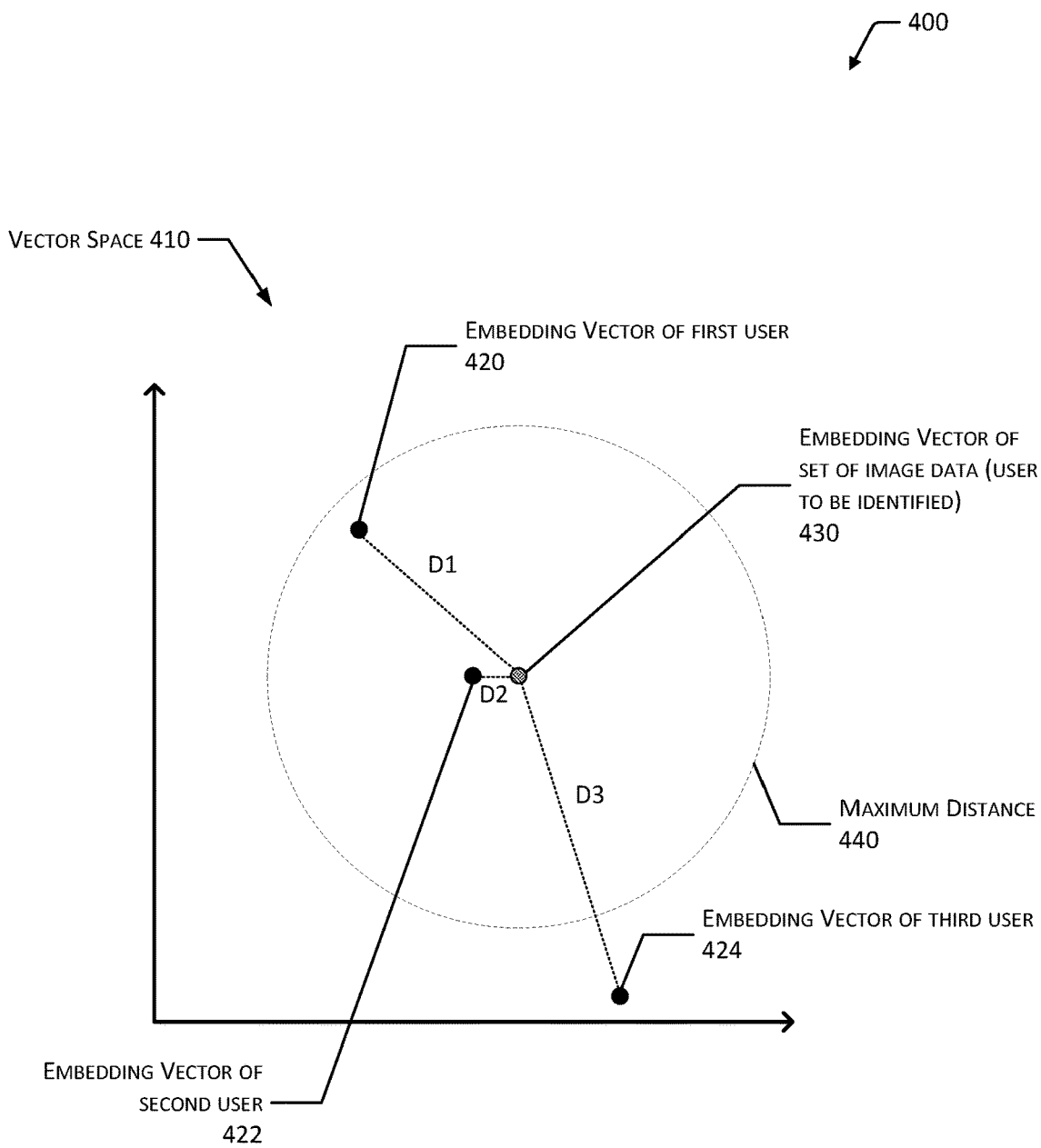
FIG. 4 illustrates relative points in vector space that are associated with embedding vector data that are used to recognize a particular user, according to some implementations.

FIG. 4 illustrates a graph 400 of a vector space 410 and relative points therein that are associated with embedding vector data 164 that are used to recognize a particular user, according to some implementations.

The vector space 410 depicted is two-dimensional for ease of illustration and not by way of limitation. For example, the processing module 160 may express vector data 164 within an n-dimensional space.

Points in the vector space 410 corresponding to an embedding vector of a first user 420, an embedding vector of a second user 422, and an embedding vector of a third user 424 are shown. An unidentified user has presented their hand 102 to the scanner 104, and a set of image data 152 has been processed to determine embedding vector data 164 representing the features in that set of image data 152. For example, the embedding vector data 164 may be based on the aggregate data 172 corresponding to the set of image data 152. A point for the embedding vector of the set of image data for the user to be identified is shown at 430.

The comparison module 166 may determine distances between the point in the vector space 410 that is associated with the embedding vector of the set of image data for the user to be identified 430 and points associated with other embedding vectors. A maximum distance 440 in the vector space 410 may be specified relative to a point associated with the embedding vector of the set of image data for the user to be identified 430. Identities corresponding to embedding vector data 164 of users in the enrolled user data 182 that are greater than the maximum distance 440 may be disregarded for consideration as possible identities. For example, the point associated with the embedding vector of the third user 424 is outside the maximum distance 440 and so the third user 424 is not deemed eligible for consideration. The point in the vector space 410 that is associated with the embedding vector of the set of image data for the user to be identified 430 is a third distance D3 from the point associated with the embedding vector of the third user 424.

Within the maximum distance 440, the point in the vector space 410 that is associated with the embedding vector of the set of image data for the user to be identified 430 is a first distance D1 from the point associated with the embedding vector of the first user 420 and a second distance D2 from the point associated with the embedding vector of the second user 422. The first distance D1 is greater than the second distance D2. The identity associated with the shortest distance may be used to determine the identity to assert. As a result, the user to be identified may be deemed to be the second user. In other implementations, other techniques may be used to compare embedding vector data 164 or information derived therefrom.

Figure 5:
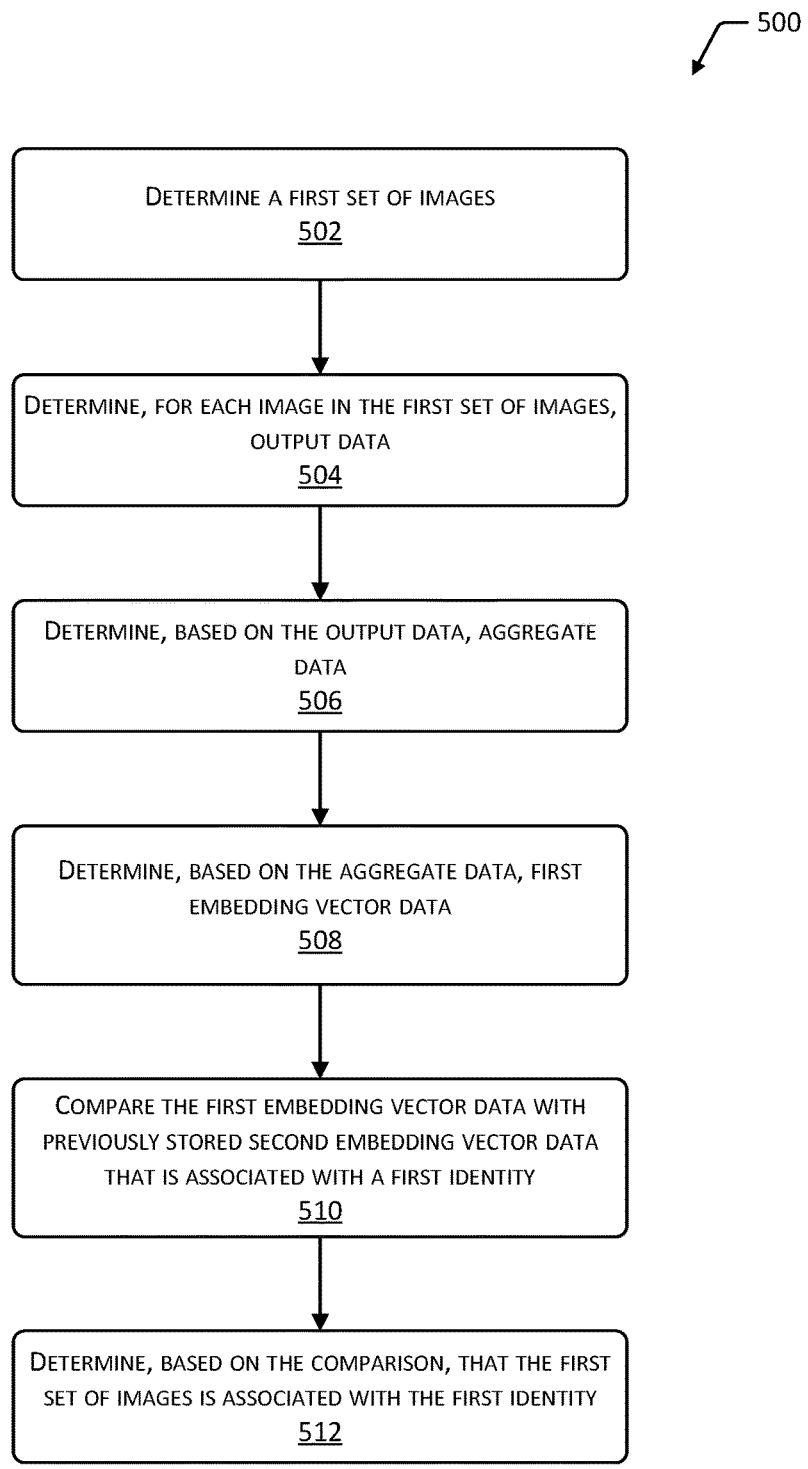
FIG. 5 is a flow diagram of a process to determine embedding vector data from a set of images using aggregate data, according to some implementations.

FIG. 5 is a flow diagram 500 of a process to determine embedding vector data 164 from a set of image data 152, according to some implementations. The process may be implemented at least in part by the processing module 160.

At 502 a first set of image data 152 is determined. For example, the scanner 104 may be used to acquire a plurality of input image data 112 of a portion of at least a portion of a user, such as the hand 102.

At 504 a first set of output data 262 is determined. For example, a first convolutional neural network (CNN) may be used to determine the output data 262. As described above, each instance of output data 262 is based on a corresponding instance of image data 202 in the first set of image data 152.

At 506 based on the first set of output data 262, first aggregate data 172 is determined. For example, one or more of the output data 262 may be combined by one or more of selecting a maxima for a particular spatial region such as a patch, determining a weight average for a particular spatial region, or other techniques.

At 508 based on the aggregate data 172, first embedding vector data 164 is determined. For example, the aggregate data 172 may be provided as input to the embedding vector module 240 that comprises a second portion of the CNN that operates as an embedding layer.

At 510 the first embedding vector data 164 is compared to previously stored embedding vector data 164. In one implementation, identity may be determined by comparing distances in the vector space 410 between a point in the first embedding vector data 164 and the points associated with previously stored embedding vector data 164 in the enrolled user data 182. For example, a distance between a first point in a vector space 410 that is associated with the first embedding vector data 164 and a second point in the vector space 410 that is associated with second embedding vector data 164 is less than a threshold value. A first identity that is associated with the second embedding vector data 164 may be determined based on the enrolled user data 182.

At 512, based on the comparison, recognition data 168 is determined that associates the first identity with the user that is associated with the first set of image data 152. Once determined, the recognition data 168 may be provided to another system, such as the facility management module 190, a payment processing system, and so forth.

In some implementations one or more operations of the process may be performed by the computing device 106 of the scanner 104. For example, the computing device 106 of the scanner 104 may determine the first embedding vector data 164. The first embedding vector data 164 may then be encrypted and sent to another computing device, such as a server executing the comparison module 166.

Figure 6:
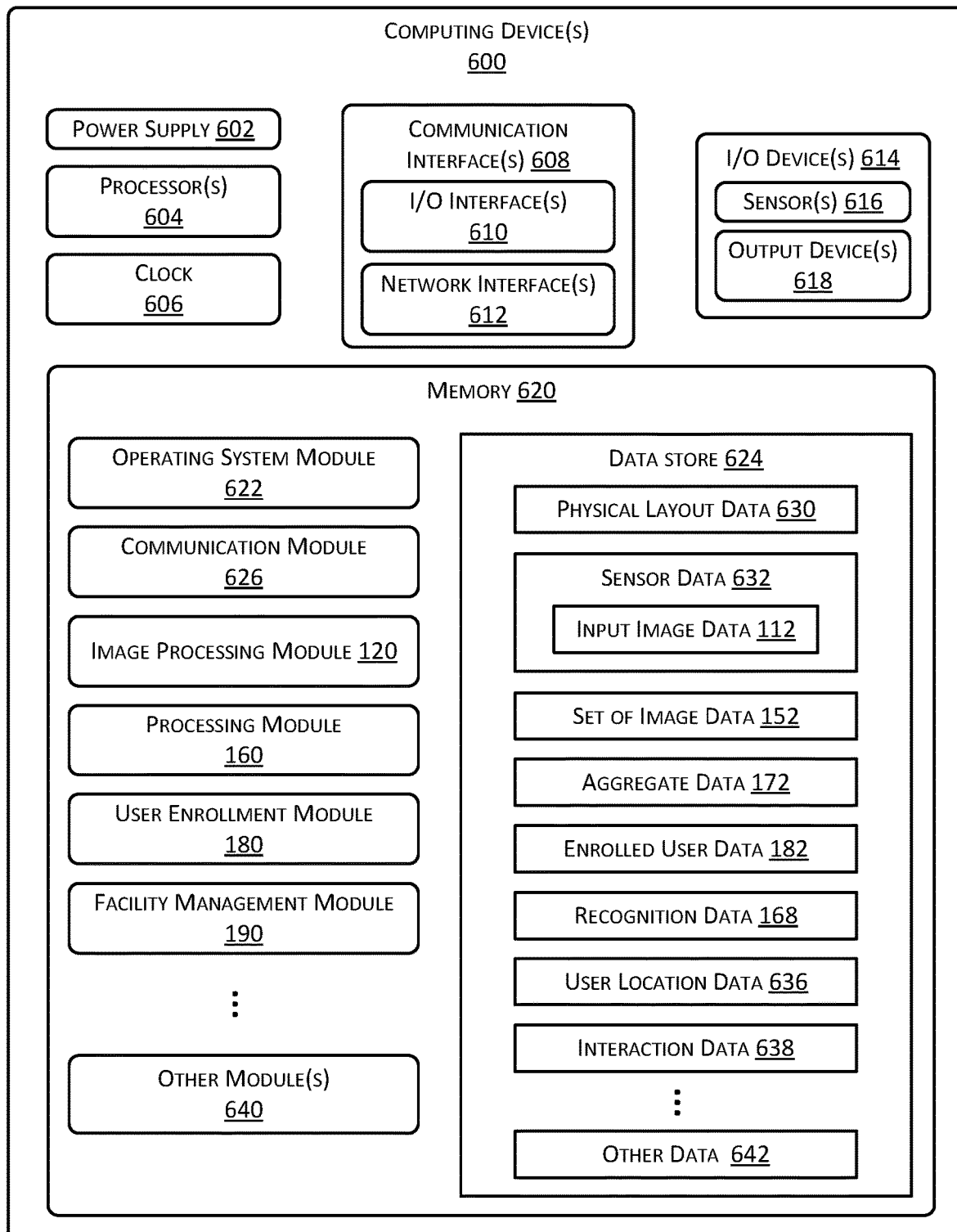
FIG. 6 is a block diagram of a computing device to use to determine embedding vector data based on aggregate data and recognize a user based on that embedding vector data, according to some implementations.

FIG. 6 is a block diagram of a computing device to determine embedding vector data 164 and recognize a user based on that embedding vector data 164, according to some implementations.

The computing device 600 may be within the scanner 104, may comprise a server, and so forth. The computing device 600 may be physically present at the facility, may be accessible by a network, or a combination of both. The computing device 600 does not require end-user knowledge of the physical location and configuration of the system that delivers the services. Common expressions associated with the computing device 600 may include "embedded system", "on-demand computing", "software as a service (SaaS)", "platform computing", "network-accessible platform", "cloud services", "data centers", and so forth. Services provided by the computing device 600 may be distributed across one or more physical or virtual devices.

One or more power supplies 602 may be configured to provide electrical power suitable for operating the components in the computing device 600. The one or more power supplies 602 may comprise batteries, capacitors, fuel cells, photovoltaic cells, wireless power receivers, conductive couplings suitable for attachment to a power source such as provided by an electric utility, and so forth. The computing device 600 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 600 may include one or more communication interfaces 608 such as input/output (I/O) interfaces 610, network interfaces 612, and so forth. The communication interfaces 608 enable the computing device 600, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 600 or may be externally placed.

The network interfaces 612 may be configured to provide communications between the computing device 600 and other devices, such as scanners 104, routers, access points, and so forth. The network interfaces 612 may include devices configured to couple to personal area networks (PANS), local area networks (LANs), wireless local area networks (WLANS), wide area networks (WANs), and so forth. For example, the network interfaces 612 may include devices compatible with Ethernet, Wi-Fi, Bluetooth, Zig-Bee, and so forth.

The computing device 600 may also include one or more busses or other internal communications hardware or software that allow for the transfer of data between the various modules and components of the computing device 600.

As shown in FIG. 6, the computing device 600 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 600. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including the computing devices 600, network attached storage devices, and so forth.

A communication module 626 may be configured to establish communications with one or more of the scanners 104, sensors 616, display devices, other computing devices 600, or other devices. The communications may be authenticated, encrypted, and so forth.

The memory 620 may also store one or more of the image processing module 120, the processing module 160, or the user enrollment module 180, as described above.

The memory 620 may store the facility management module 190. The facility management module 190 may perform various functions, such as tracking items between different inventory locations, to and from carts, generating restocking orders, directing operation of robots within the facility, using the recognition data 168 to associate a particular user identity with a user in the facility, and so forth. During operation, the facility management module 190 may access sensor data 632 such as one or more of image data from cameras, weight data from weight sensors, and so forth.

Information used by the facility management module 190 may be stored in the data store 624. For example, the data store 624 may be used to store physical layout data 630, sensor data 632, enrolled user data 182, recognition data 168, user location data 636, interaction data 638, and so forth.

The physical layout data 630 may provide information indicative of where scanners 104, cameras, weight sensors, antennas for radio receivers, inventory locations, and so forth are in the facility with respect to one another. For example, the physical layout data 630 may comprise information representative of a map or floor plan of the facility with relative positions of gates with scanners 104 and inventory locations.

The sensor data 632 may comprise information obtained from one or more of the sensors 616 in or associated with the facility.

The enrolled user data 182 may comprise the embedding vector data 164 that is associated with particular user accounts. For example, the enrolled user data 182 may comprise a first embedding vector data 164 for user "Bob", second embedding vector data 164 for user "Pat", and so forth.

The facility management module 190 may generate the user location data 636 that is indicative of the location of the user within the facility. For example, the facility management module 190 may use image data obtained by the cameras to determine a location of the user. In other implementations, other techniques may be used for determining the user location data 636. For example, data from a smart floor may be used to determine the location of the user.

A user identity may be associated with user location data 636 based on the recognition data 168. For example, the user enters the facility and has their palm scanned, producing recognition data 168 that is indicative of their time of entry, a scanner 104 associated with where they entered, and their user identifier. The user location data 636 indicative of a path of a user that begins at the scanner 104 at the time of entry may be associated with the user identifier in the recognition data 168.

Based on the user location data 636 and the interaction data 638, a particular interaction may be associated with an account of a particular user. For example, if the user location data 636 indicates that the user is present in front of inventory location 492 at time 17:47:20 and the interaction data 638 indicates a pick of a quantity of one item from an area on inventory location 492 at 17:47:27, the user may be billed for that pick.

The facility management module 190 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 190 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 190 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the recognition data 168 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the recognition data 168. In another example, a robot may incorporate a scanner 104. The robot may use the recognition data 168 to determine whether to deliver a parcel to the user, and based on the recognition data 168, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a memory, storing first computer-executable instructions; and
one or more hardware processors to execute the first computer-executable instructions to:
  acquire a first set of images of a portion of a user;
  determine, for each image in the first set of images, output data, wherein the output data comprises mask data and feature map data;
  determine, based on the output data, first aggregate data;
  determine, based on the first aggregate data, first embedding vector data;
  determine a distance between a first point in a vector space that is associated with the first embedding vector data and a second point in a vector space that is associated with second embedding vector data is less than a threshold value;
  determine a first identity that is associated with the second embedding vector data; and
  determine recognition data that associates the first identity with the user.

2. The system of claim 1, wherein:
the mask data comprises a weight value associated with a portion of a first image in the first set of images, wherein the weight value is representative of usefulness of the portion of the first image in determining the first embedding vector data; and
the feature map data comprises a multidimensional array of data that is representative of content of the portion of the first image.

3. The system of claim 1, the one or more hardware processors to further execute the first computer-executable instructions to:
determine a first weight associated with a first portion of a first image, wherein the first weight is associated with first feature map data;
determine a second weight associated with a second portion of a second image, wherein the first portion and the second portion correspond to a same area, and further wherein the second weight is associated with second feature map data; and
determine the second weight is greater than the first weight;
wherein the first aggregate data comprises the second feature map data.

4. The system of claim 1, the one or more hardware processors to further execute the first computer-executable instructions to:
   determine a first weight associated with a first portion of a first image, wherein the first weight is associated with first feature map data;
   determine a second weight associated with a second portion of a second image, wherein the first portion and the second portion correspond to a same area, and further wherein the second weight is associated with second feature map data; and
   determine the first aggregate data based at least in part on:
      the first weight and the first feature map data, and
      the second weight and the second feature map data.

5. The system of claim 1, the one or more hardware processors to further execute the first computer-executable instructions to:
   acquire a first image of the first set of images;
   determine first output data based on the first image;
   acquire a second image of the first set of images;
   determine second output data based on the second image;
   determine third output data based on the first output data and the second output data;
   acquire a third image of the first set of images;
   determine fourth output data based on the third image in the first set of images; and
   determine the first aggregate data based on the third output data and the fourth output data.

6. The system of claim 1, the one or more hardware processors to further execute the first computer-executable instructions to:
   determine the first embedding vector data by processing the first aggregate data with a convolutional neural network.

7. The system of claim 1, wherein:
   the recognition data is indicative of one or more of:
      a time of entry to a facility associated with the user, or
      an identification of a scanner associated with a location where the user entered the facility.

8. The system of claim 1, wherein the first set of images comprises:
   a first image of a hand, wherein the hand was illuminated with light having a first polarization; and
   a second image of the hand, wherein the hand was illuminated with light having a second polarization.

9. A computer-implemented method comprising:
   determining a first set of images of at least a portion of a user;
   determining, for each image in the first set of images, output data comprising mask data and feature map data;
   determining, based on the output data, first aggregate data;
   determining, based on the first aggregate data, first embedding vector data;
   compare the first embedding vector data with second embedding vector data;
   determine a first identity that is associated with the second embedding vector data; and
   determine recognition data that associates the first identity with the user.

10. The method of claim 9, wherein:
   the mask data comprises a weight value associated with a portion of a first image in the first set of images; and
   the feature map data is representative of content of the portion of the first image.

11. The method of claim 9, further comprising:
   determining a first weight associated with a first portion of a first image, wherein the first weight is associated with first feature map data;
   determining a second weight associated with a second portion of a second image, wherein the first portion and the second portion correspond to a same area, and further wherein the second weight is associated with second feature map data;
   determining the second weight is greater than the first weight; and
   wherein the first aggregate data comprises the second feature map data.

12. The method of claim 9, further comprising:
   determining a first weight associated with a first portion of a first image, wherein the first weight is associated with first feature map data;
   determining a second weight associated with a second portion of a second image, wherein the first portion and the second portion correspond to a same area, and further wherein the second weight is associated with second feature map data; and
   determining the first aggregate data based at least in part on:
      the first weight and the first feature map data, and
      the second weight and the second feature map data.

13. The method of claim 9, further comprising:
   acquiring a first image of the first set of images;
   determining first output data based on the first image in the first set of images;
   acquiring a second image of the first set of images;
   determining second output data based on the second image in the first set of images;
   determining third output data based on the first output data and the second output data;
   acquiring a third image of the first set of images;
   determining fourth output data based on the third image in the first set of images; and
   determining the first aggregate data based on the third output data and the fourth output data.

14. The method of claim 9, the determining the first embedding vector data further comprising:
   processing the first aggregate data with a convolutional neural network.

15. The method of claim 9, the comparing the first embedding vector data with the second embedding vector data comprising:
   determining a distance between a first point in a vector space that is associated with the first embedding vector data and a second point in a vector space that is associated with the second embedding vector data is less than a threshold value.

16. The method of claim 9, wherein the first set of images comprises one or more of:
   a first image of a hand, wherein the hand was illuminated with light having a first polarization; or
   a second image of the hand, wherein the hand was illuminated with light having a second polarization.

17. A system comprising:
   a memory, storing first computer-executable instructions; and
   one or more hardware processors to execute the first computer-executable instructions to:
      determine a first set of images;
      determine a first set of output data using a first neural network that accepts the first set of images as input, wherein each instance of output data is based on one image in the first set of images;
determine first aggregate data based on the first set of output data;
determine first embedding vector data using a second neural network that accepts the first aggregate data as input;
compare the first embedding vector data with second embedding vector data;
determine a first identity that is associated with the second embedding vector data; and
determine recognition data that associates the first identity with a user.

18. The system of claim 17, the one or more hardware processors to further execute the first computer-executable instructions to:
acquire a first image of the first set of images;
determine first output data based on the first image in the first set of images;
acquire a second image of the first set of images;
determine second output data based on the second image in the first set of images;
determine third output data based on the first output data and the second output data;
acquire a third image of the first set of images;
determine fourth output data based on the third image in the first set of images; and
determine the first aggregate data based on the third output data and the fourth output data.

19. The system of claim 17, the first computer-executable instructions to compare the first embedding vector data with the second embedding vector data comprising instructions to:
determine a distance between a first point in a vector space that is associated with the first embedding vector data and a second point in a vector space that is associated with the second embedding vector data is less than a threshold value.

20. The system of claim 17, wherein each image of the first set of images comprises one or more of:
a first image of a hand, wherein the hand was illuminated with light having a first polarization; or
a second image of the hand, wherein the hand was illuminated with light having a second polarization.

\* \* \* \* \*

UNITED STATES PATENT AND TRADEMARK OFFICE
CERTIFICATE OF CORRECTION

| | |
|---|---|
| PATENT NO. | : 11,670,104 B1 |
| APPLICATION NO. | : 17/097707 |
| DATED | : June 6, 2023 |
| INVENTOR(S) | : Zamir et al. |

It is certified that error appears in the above-identified patent and that said Letters Patent is hereby corrected as shown below:

In the Claims

Column 19, Claim 9, Line 57:
Currently reads "compare the first embedding vector data"
Where it should read --comparing the first embedding vector data--.

Column 19, Claim 9, Line 59:
Currently reads "determine a first identity"
Where it should read --determining a first identity--.

Column 19, Claim 9, Line 61:
Currently reads "determine recognition data"
Where it should read --determining recognition data--.

Signed and Sealed this
Eleventh Day of July, 2023

Katherine Kelly Vidal
*Director of the United States Patent and Trademark Office*